(12) United States Patent
Kottapalli

(10) Patent No.: US 11,184,273 B2
(45) Date of Patent: Nov. 23, 2021

(54) MACHINE LEARNING-BASED PATH PRIORITY DETERMINATION FOR ROUTING DATA IN SOFTWARE-DEFINED NETWORKS

(71) Applicant: VMware, Inc., Palo Alto, CA (US)

(72) Inventor: Ravi Kumar Reddy Kottapalli, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/565,522

(22) Filed: Sep. 10, 2019

(65) Prior Publication Data

US 2021/0029019 A1  Jan. 28, 2021

(30) Foreign Application Priority Data

Jul. 24, 2019  (IN) .............................. 201941029902

(51) Int. Cl.
*H04L 12/751* (2013.01)
*H04L 12/26* (2006.01)
*H04L 12/733* (2013.01)
*H04L 12/729* (2013.01)

(52) U.S. Cl.
CPC .......... *H04L 45/08* (2013.01); *H04L 43/0888* (2013.01); *H04L 45/122* (2013.01); *H04L 45/125* (2013.01)

(58) Field of Classification Search
CPC ... H04L 45/08; H04L 43/0888; H04L 45/122; H04L 45/125
See application file for complete search history.

(56) References Cited

U.S. PATENT DOCUMENTS

| 2016/0028615 A1* | 1/2016 | Lee | ....................... H04L 47/122 |
| | | | 370/237 |
| 2016/0028637 A1* | 1/2016 | Vasseur | ................... H04L 47/25 |
| | | | 370/235 |
| 2020/0112495 A1* | 4/2020 | Attarwala | ............... H04L 43/08 |

* cited by examiner

*Primary Examiner* — Kevin M Cunningham

(57) ABSTRACT

In one example, a non-transitory computer readable storage medium may include instructions that, when executed by a processor, cause the processor to obtain historical logs associated with a plurality of available paths between a source node and a destination node. The historical logs may be obtained for a first interval by routing data over the available paths based on a first priority order and corresponding network characteristics parameters. Further, non-transitory computer readable storage medium may include instructions to determine a modified first priority order of the available paths and corresponding modified network characteristic parameters by analyzing the historical logs using a machine learning model and route the data from the source node to the destination node based on the modified first priority order.

17 Claims, 4 Drawing Sheets

| AVAILABLE PATHS 302 | PRIORITY 304 | LATENCY 306 | LOSS 308 | DATA RATE 310 | DELAY 312 |
|---|---|---|---|---|---|
| GW 202 | 2 | X | Y | ABC/SEC | Z |
| GW 204 | 1 | A | B | XYZ/SEC | B |
| GW 206 | 3 | T | F | FZX/SEC | C |

| AVAILABLE PATH 302 | PRIORITY 304 | LATENCY 306 | LOSS 308 | DATA RATE 310 | DELAY 312 |
|---|---|---|---|---|---|
| GW 202 | 1 | A | B | XYZ/SEC | B |
| GW 204 | 2 | X | Y | ABC/SEC | Z |
| GW 206 | 3 | T | F | FZX/SEC | C |

MACHINE LEARNING-BASED PATH PRIORITY DETERMINATION FOR ROUTING DATA IN SOFTWARE-DEFINED NETWORKS

RELATED APPLICATIONS

Benefit is claimed under 35 U.S.C. 119(a)-(d) to Foreign Application Serial No. 201941029902 filed in India entitled "MACHINE LEARNING-BASED PATH PRIORITY DETERMINATION FOR ROUTING DATA IN SOFTWARE DEFINED NETWORKS", on Jul. 24, 2019, by VMWARE, INC., which is herein incorporated in its entirety by reference for all purposes.

TECHNICAL FIELD

The present disclosure relates to communication networks, and more particularly to methods, techniques, and systems for routing data between a source node and a destination node in a software-defined network based on a priority order of available paths.

BACKGROUND

Wide area networks (WANs) may allow organizations to extend their computer networks over significantly large distances, for example, to connect remote branch offices to datacenters and each other. Further, extending networks over significantly large distances and across multiple carriers' networks may face challenges in terms of network congestion, jitter, packet loss, and the like. In this regard, a software-defined wide area network (SD-WAN) may be used to address these challenges. The SD-WAN may refer to a specific application of software-defined networking (SDN) technology applied to WAN connections. For example, the SD-WANs may employ centrally managed WAN edge devices placed in the branch offices to establish logical connections with other branch edge devices across the WAN.

Figure 1:
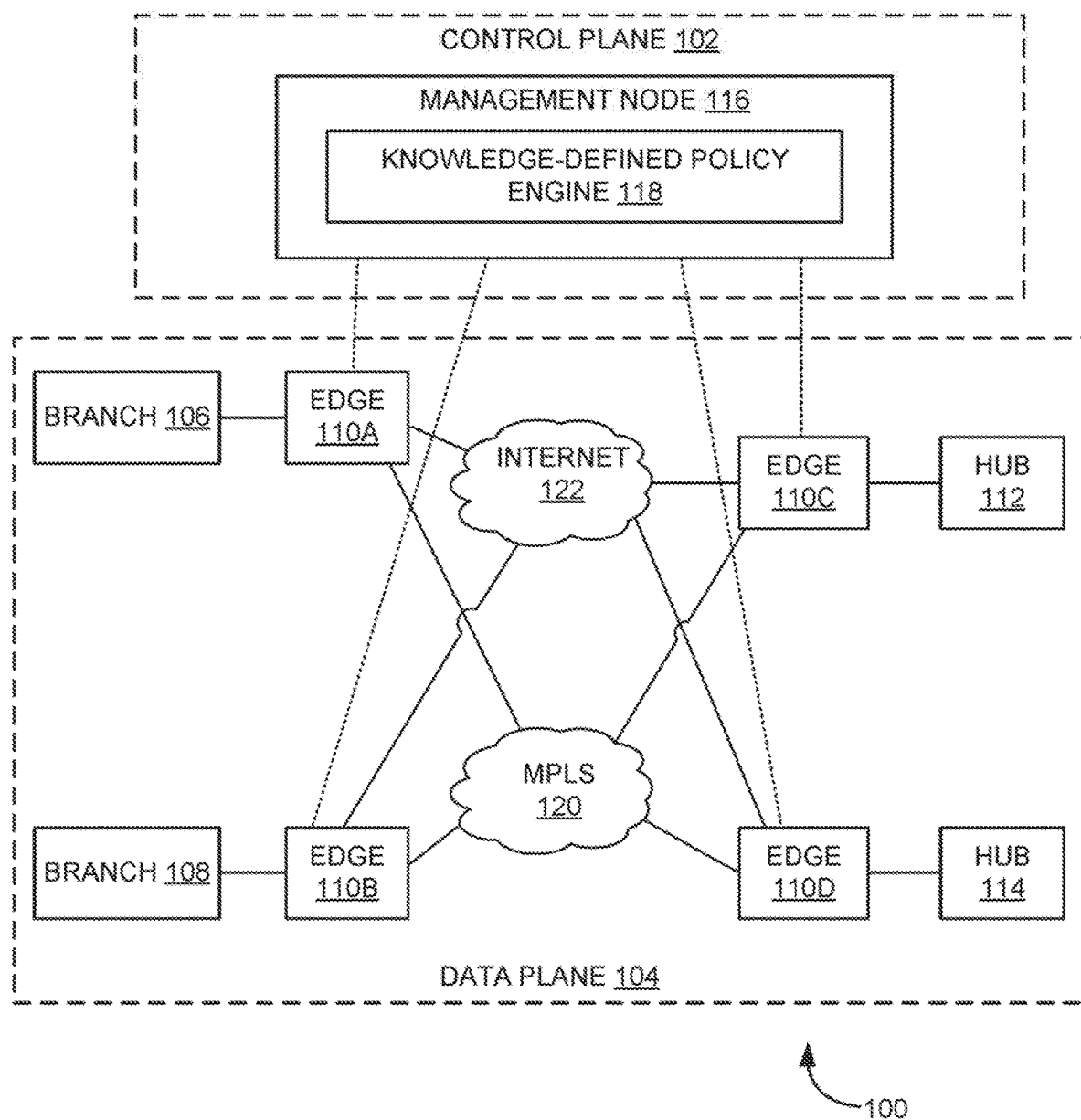
FIG. 1 is a block diagram of an example system illustrating a knowledge-defined policy engine to route data between a source node and a destination node based on a priority order of available paths.

The drawings described herein are for illustration purposes only and are not intended to limit the scope of the present subject matter in any way.

DETAILED DESCRIPTION

Embodiments described herein may provide an enhanced computer-based and network-based method, technique, and system for routing data between nodes in a software-defined network based on a priority order of available paths between the nodes. Example software-defined network may be a software-defined wide area network (SD-WAN). The SD-WAN may be a specific application of software-defined networking (SDN) technology applied to WAN connections, which may be used to connect enterprise networks, including branch offices and datacenters over significantly large geographic distances, for instance. The SD-WAN can simplify management and operation of a WAN by decoupling networking hardware from its control mechanism. In one example, the SD-WANs may employ centrally managed branch edge devices placed in the branch offices to establish logical connections with other branch edge devices across the WAN. Further, the SD-WAN may have a provision to utilize different types of network connectivity like private WAN (MPLS), internet and cellular (e.g., 3G or long-term evolution (LTE)) connectivity to reach other branch offices, datacenters, cloud entities, and central office or headquarters.

In an example SD-WAN deployment, the SD-WAN may include multiple branch offices having corresponding edge devices (e.g., branch edge 1 and branch edge 2), a set of cloud gateways (e.g., GW1 and GW2) and a management node (e.g., an orchestrator) to provide a management functionality to the branch offices (e.g., branch edge 1 and branch edge 2) by residing in Cloud, for instance. In some examples, the cloud gateways (e.g., GW1 and GW2) and hub edges (e.g., hub 1 and hub 2) may provide a secure communication between the branch offices (e.g., branch edge 1 and branch edge 2). In order to provide better network resiliency and redundancy, a branch to branch communication may include multiple paths to reach same destination. In this example, consider there are four available paths between two branch offices (e.g., branch edge 1 and branch edge 2) to communicate. For example, branch edge 1 may communicate with branch edge 2 via path 1 (e.g., hub 1), via path 2 (e.g., hub 2), via path 3 (e.g., GW1), and via path 4 (e.g., GW2).

In some examples, dynamic routing protocols such as open shortest path first (OSPF) or border gateway protocol (BGP) may be used to provide the connectivity between the branches (e.g., branch edge 1 and branch edge 2). Each of these dynamic routing protocols may have unique route metrics (e.g., cost, preference, route type, and the like) to determine a best path to route network traffic from branch edge 1 to branch edge 2. However, the dynamic routing protocols may not consider real-time network characteristic parameters (e.g., latency, jitter, delay, and the like) to determine the best path. Thus, the best path determined by the dynamic routing protocols may not be accurate.

Further, once the best path is determined, the data may be routed via the best path until the best path becomes unreachable or not available. Upon determining that the best path is not available, the next best path may become active. However, such methods may lack in knowledge to determine the best path in real-time or use available paths between the branches to its capacity, thereby may exhibit un-equal load balancing between the available paths.

In other examples, a user may statically define an available path among the multiple available paths to route the data. In this example, all the applications from branch edge 1 may use the defined path to route the data. Thus, the path may be bottlenecked with bandwidth and the performance of the applications may be negatively impacted.

Examples described herein may route data between branch nodes (e.g., a source node and a destination node) in a software-defined network based on a priority order of available paths. Examples described herein may dynamically determine the priority order of the available paths based on network characteristic parameters and utilize all the available paths to its capacity without underutilizing any available path.

Examples described herein may dynamically determine a priority of the available paths based on analyzing historical data, predict a best available path using machine learning algorithms, and auto correct in case of errors in the best available path selection by sending probe traffic at regular intervals. In one example, the historical logs associated with the available paths between the source node and the destination node in the software-defined network may be obtained. The historical logs may be obtained for a first interval by routing data over the available paths based on a first priority order and corresponding network characteristics parameters. Further, a modified first priority order of the available paths and corresponding modified network characteristic parameters may be determined by analyzing the historical logs using a machine learning model. Furthermore, the data may be routed from the source node to the destination node based on the modified first priority order.

System Overview and Examples of Operation

FIG. 1 is a block diagram of an example system 100 illustrating a knowledge-defined policy engine 118 to route data between a source node (i.e., an edge 110A) and a destination node (i.e., an edge 110B) based on a priority order of available paths. Example system 100 may utilize a software-defined network for communication between source node 110A and destination node 110B. Example software-defined network may be an SD-WAN. The SD-WAN may enable enterprises to support application growth, network agility, and simplified branch implementations while delivering optimized access to cloud services, private datacenters, and enterprise applications simultaneously over both broadband Internet and private links. In one example, the SD-WAN may include a distributed network of SD-WAN gateways, a cloud-based SD-WAN orchestrator (e.g., management node 116), and a branch platform.

As shown in FIG. 1, system 100 may include a control plane 102 and a data plane 104. Control plane 102 may refer to systems that make decisions about where network traffic (e.g., data) is sent in the SD-WAN. Data plane 104 may refer to underlying systems that facilitate forwarding of the network traffic to selected destinations.

Data plane 102 may include multiple branch offices (e.g., branches 106 and 108). Each branch office (e.g., branches 106 and 108) may establish logical connections with other branch offices via corresponding edge devices (e.g., edge 110A and 110B). In one example, branch offices 106 and 108 may represent virtual infrastructure (e.g., a virtual machine or an application) or physical infrastructure in different branch locations. Further, data plane 102 may include multiple central offices or enterprise datacenters (e.g., hub 112 and hub 114) with corresponding edge or gateway devices (e.g., edge 110C and 110D) communicatively connected to the branch offices 106 and 108. In this example, branch offices 106 and 108 may use edges 110A and 110B and multiple networks (e.g., Internet 122, MPLS 120, cellular network, and the like) can be connected to edges 110A and 110B. Enterprise datacenters 112 and 114 may also be connected to the multiple networks via edges 110C and 110D. Similarly, system 100 can include software as a service (SaaS) cloud that is connected to the multiple networks by respective gateway devices.

Further, control plane 102 may include management node 116 communicatively coupled to edges 110A, 110B, 110C, and 110D. In one example, management node 116 may be a management domain, which may be a special-purpose workload domain dedicated to infrastructure and management tasks. In other examples, management node 116 may be a centralized control application to securely and intelligently direct traffic across the WAN.

For example, management node 116 may be an orchestrator that coordinates the required networking hardware and software elements to support applications and services. Management node 116 may configure end-to-end SD-WAN managed services between edges (e.g., 110A, 110B, 110C, and 110D) and the gateways over one or more underlay networks (e.g., Internet 122 and MPLS 120), setting up application-based forwarding over the networks based on security, quality of service (QoS), or business/intent-based policies.

In one example, management node 116 may monitor connections between the gateways and edges 110A, 110B, 110C, and 110D in data plane 104 and define routing patterns between them. In one example, management node 116 may reside in a cloud having central management control over the systems in data plane. The cloud may be a private cloud, a public cloud, or a hybrid cloud. The cloud may be used to provide or deploy various types of cloud services such as infrastructure as a service (IaaS), platform as a service (PaaS), software as a service (SaaS), and the like.

As shown in FIG. 1, management node 116 may include knowledge-defined policy engine 118. In one example, knowledge-defined policy engine 118 may be a software entity residing in a central management station such as management node 116, a software-defined datacenter (SDDC) manager, a next generation VMware cloud foundation (VCF) central management orchestrator, or the like.

During operation, knowledge-defined policy engine 118 may determine available paths between edge 110A (herein after referred to as source node 110A) and edge 110B (i.e., herein after referred to as destination node 110B) in the software-defined network using routing protocols such as an OSPF, a BGP, or the like. Each of the available paths may include a communication link including a link type selected from a group consisting of Internet connection 122, MPLS connection 120, a cellular connection, and a cable connection. Example available paths is described in FIG. 2.

Initially, knowledge-defined policy engine 118 may route first sample data over the available paths between source node 110A and destination node 110B. Further, knowledge-defined policy engine 118 may determine a first priority order of the available paths by analyzing network characteristic parameters associated with each of the available paths based on the sample data. For example, the network characteristic parameters may be selected from a group consisting of latency, jitter, round-trip time (RTT), packet loss, and data rate per second.

Upon determining the first priority order, knowledge-defined policy engine 118 may route data from source node 110A to destination node 110B for a first interval (e.g., a predefined interval) using at least one of the available paths based on the first priority order. For example, knowledge-defined policy engine 118 may dynamically route the data associated with different applications via the available paths based on the first priority order and a priority of each of the applications.

Figures 2, 3A, 3B:
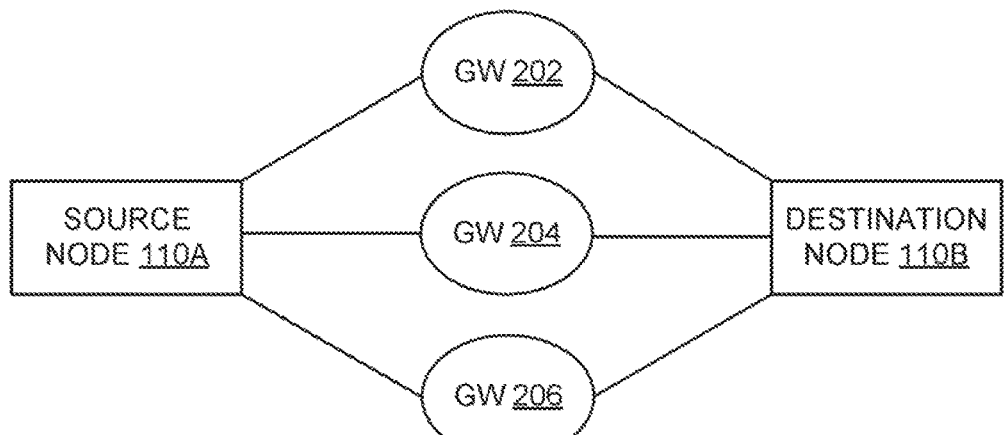
FIG. 2 is a block diagram of an example system illustrating multiple available paths between a source node and a destination node.
FIG. 3A shows an example routing policy table, depicting a priority order of the available paths of FIG. 2.
FIG. 3B shows the example routing policy table of FIG. 3A, depicting a modified priority order of the available paths.

In one example, knowledge-defined policy engine 118 may maintain a routing policy table to include the available paths, the first priority order of the available paths, and the corresponding network characteristic parameters upon determining the first priority order. Further, knowledge-defined policy engine 118 may route the data from source node 110A to destination node 110B according to the routing policy table. An example routing policy table is depicted in FIG. 3A.

In one example, knowledge-defined policy engine 118 may derive a policy-based routing rules based on the routing policy table and push the routing rules to source node 110A and destination node 110B. Further, source node 110A may route the data based on the routing rules. In another example, knowledge-defined policy engine 118 may alter existing routing protocol based on the routing policy table to route data between source node 110A and destination node 110B.

Further, knowledge-defined policy engine 118 may obtain historical logs associated with the available paths for the first interval. Knowledge-defined policy engine 118 may then determine a modified first priority order of the available paths and corresponding modified network characteristic parameters by analyzing the historical logs using a machine learning model, for instance. In one example, the machine learning model may refer to an application of artificial intelligence (AI) that may provide systems an ability to automatically learn from training data (e.g., the historical logs) and enhance traffic management without being explicitly programmed. Example machine learning model can be an analytical model performing predictive analysis such as a logistic regression.

Upon determining the modified first priority order, knowledge-defined policy engine 118 may route the data from source node 110A to destination node 110B based on the modified first priority order. In one example, knowledge-defined policy engine 118 may dynamically update the routing policy table to include the modified first priority order of the available paths and the corresponding modified network characteristic parameters upon determining the modified first priority order. An example modified routing policy table is depicted in FIG. 3B.

Furthermore, knowledge-defined policy engine 118 may route second sample data over the available paths between source node 110A and destination node 110B. In one example, knowledge-defined policy engine 118 may route the second sample data over the available paths between source node 110A and destination node 110B at predefined intervals or when there is any delta or drift in actual network characteristic parameters. In this example, knowledge-defined policy engine 118 may:

determine the actual network characteristic parameters corresponding to routing the data from source node 110A to destination node 110B in real-time during routing the data according to the modified first priority order, compare the actual network characteristic parameters with the modified network characteristic parameters, and route the second sample data over the available paths between source node 110A and destination node 110B upon detecting a drift in at least one of the actual network characteristic parameters.

In one example, knowledge-defined policy engine 118 may determine a second priority order of the available paths by analyzing current network characteristic parameters associated with each of the available paths based on the second sample data. In one example, the second priority order may be different from the modified first priority order. Further, knowledge-defined policy engine 118 may autocorrect the modified first priority order of the available paths by inputting latest logs associated with the plurality of available paths for a second interval into the machine learning model upon determining the second priority order is different from the modified first priority order. In one example, knowledge-defined policy engine 118 may dynamically modify the routing policy table to include the autocorrected modified first priority order of the available paths and corresponding current network characteristic parameters.

In some examples, the functionalities described herein, in relation to instructions to implement functions of knowledge-defined policy engine 118 and any additional instructions described herein in relation to the storage medium, may be implemented as engines or modules including any combination of hardware and programming to implement the functionalities of the modules or engines described herein. The functions of knowledge-defined policy engine 118 may also be implemented by a respective processor. In examples described herein, the processor may include, for example, one processor or multiple processors included in a single device or distributed across multiple devices. Further, management node 116 can be a service process in a management application or can be an appliance running in a datacenter to cater multiple management applications in a cloud-based environment.

FIG. 2 is a block diagram of an example system 200 illustrating multiple available paths (e.g., via gateway 202, gateway 204, and gateway 206) between source node 110A and destination node edge 110B of FIG. 1. Example source node 110A and destination node 110B may be interconnected with each other via networks. In one example, available paths between source node 110A and destination node 110B may be determined using protocols such as an OSPF, a BGP, and the like. As shown in FIG. 2, there may be three available paths (e.g., via gateway 202, gateway 204, and gateway 206) between source node 110A and destination node 110B.

Initially, there may be no historical data available to run data analytics to determine a priority order of the available paths (e.g., via gateway 202, gateway 204, and gateway 206). In this case, a first sample data may be routed over the available paths (e.g., via gateway 202, gateway 204, and gateway 206) between source node 110A and destination node 110B to determine network characteristic parameters. Example network characteristic parameters can be, but are not limited to, latency, jitter, round-trip time (RTT), packet loss, and data rate per second. Further, a first priority order of the available paths may be determined by analyzing network characteristic parameters associated with each of the available paths (e.g., via gateway 202, gateway 204, and gateway 206) based on the sample data. Example first priority order and the corresponding network characteristic parameters are depicted in FIG. 3A.

FIG. 3A shows an example routing policy table 300, depicting a priority order of the available paths of FIG. 2. Example routing policy table 300 depicts different columns such as available paths 302, network characteristic parameters (e.g., latency 306, loss 308, data rate 310, and delay 312), and priority 304. Available paths 302 may depict different available paths (e.g., via gateway 202, gateway 204, and gateway 206) between source node 110A and destination node 110B. Priority 304 may depict a priority order of the available paths (e.g., via gateway 202, gateway 204, and gateway 206) based on network characteristic parameters (e.g., latency 306, loss 308, data rate 310, delay 312). Accordingly, gateway 204 may be assigned high priority, followed by gateway 202, and then gateway 206.

Referring back to FIG. 2, based on example routing policy table 300 of FIG. 3A, real-time data may be routed from source node 110A to destination node 110B for a first interval using at least one of the available paths (e.g., via gateway 202, gateway 204, and gateway 206). Thus, the data associated with different applications may be dynamically routed via the available paths (e.g., via gateway 202, gateway 204, and gateway 206) based on the first priority order (e.g., priority 304) as depicted in FIG. 3A and a priority of each of the applications.

For example, consider there are 100 applications in a branch, and a user may select 10 applications (applications 1-10) for routing through an optimal path. In this example, there may be two approaches to identify the optimal path/gateway for the 10 applications. First Approach being a same optimal gateway (e.g., gateway 204) for all the applications (applications 1 to 10) based on the first priority order.

Second approach being selecting the different gateways for different applications based on the first priority order for better utilization of all the available paths in an optimal manner. In this example, choosing a single gateway for the applications (Applications 1-10) may overload the single path selected gateway. Therefore, gateway 204 (e.g., path 1) may be assigned for application 1 and once application 1 utilizes the path 1, the path 1 may be full on its capacity. Further, assigning path 1 to any further application may burden the link. Therefore, the knowledge-defined policy engine (e.g., knowledge-defined policy engine 118) may do the performance assessment with the current network characteristics parameters for path 1, and then assign gateway 204 for the remaining applications accordingly. If the path 1 is on its full capacity, then remaining applications will get a next best priority path (e.g., via gateway 202) based on the first priority order (e.g., priority 304 of FIG. 3A). In this way, applications 1-10 may get different gateways to reach destination node 110B.

Once the historical data corresponding to the data routed from source node 110A to destination node 110B for the first interval are obtained, a machine learning model (e.g., an analytic engine or a machine learning algorithm) may be executed to determine or predict a modified first priority order of the available paths (e.g., via gateway 202, gateway 204, and gateway 206) based on corresponding modified network characteristic parameters. Example modified first priority order and the corresponding modified network characteristic parameters are depicted in FIG. 3B.

FIG. 3B shows example routing policy table 300 of FIG. 3A, depicting a modified priority order (e.g., priority 304) of the available paths. Routing policy table 300 of FIG. 3B may depict the modified network characteristic parameters and the corresponding modified first priority order (e.g., priority 304). Accordingly, gateway 202 may be assigned high priority, followed by gateway 204, and then gateway 206.

Referring back to FIG. 2, based on example modified routing policy table 300 of FIG. 3B, the data may be routed from source node 110A to destination node 110B using at least one of the available paths (e.g., via gateway 202, gateway 204, and gateway 206).

In one example, for validating or testing the modified first priority order of the available paths (e.g., via gateway 202, gateway 204, and gateway 206), second sample data may be routed over the available paths (e.g., via gateway 202, gateway 204, and gateway 206) between source node 110A and destination node 110B at predefined intervals. In another example, second sample data may be routed over the available paths (e.g., via gateway 202, gateway 204, and gateway 206) between source node 110A and destination node 110B when any considerable difference is observed between actual network characteristic parameters and the modified network characteristic parameters. Thus, the modified first priority order (e.g., priority 304 of FIG. 3B) of the available paths (e.g., via gateway 202, gateway 204, and gateway 206) may be autocorrected if a drift in at least one of the actual network characteristic parameters is observed based on the comparison.

For example, source node 110A may route the data based on the data rate 310 specified in routing policy table 300 of FIG. 3B. Further, the actual network characteristic parameters may be monitored and compared with the modified network characteristic parameters in routing policy table 300 of FIG. 3B. When there is any delta or drift between the actual network characteristic parameters (e.g., drift in data rate 310 (e.g., xyz/sec to abc/sec)), a trigger may be generated to probe the second sample data to update routing policy table 300 of FIG. 3B, as explained with respect to FIG. 1.

Example Processes

Figure 4A:
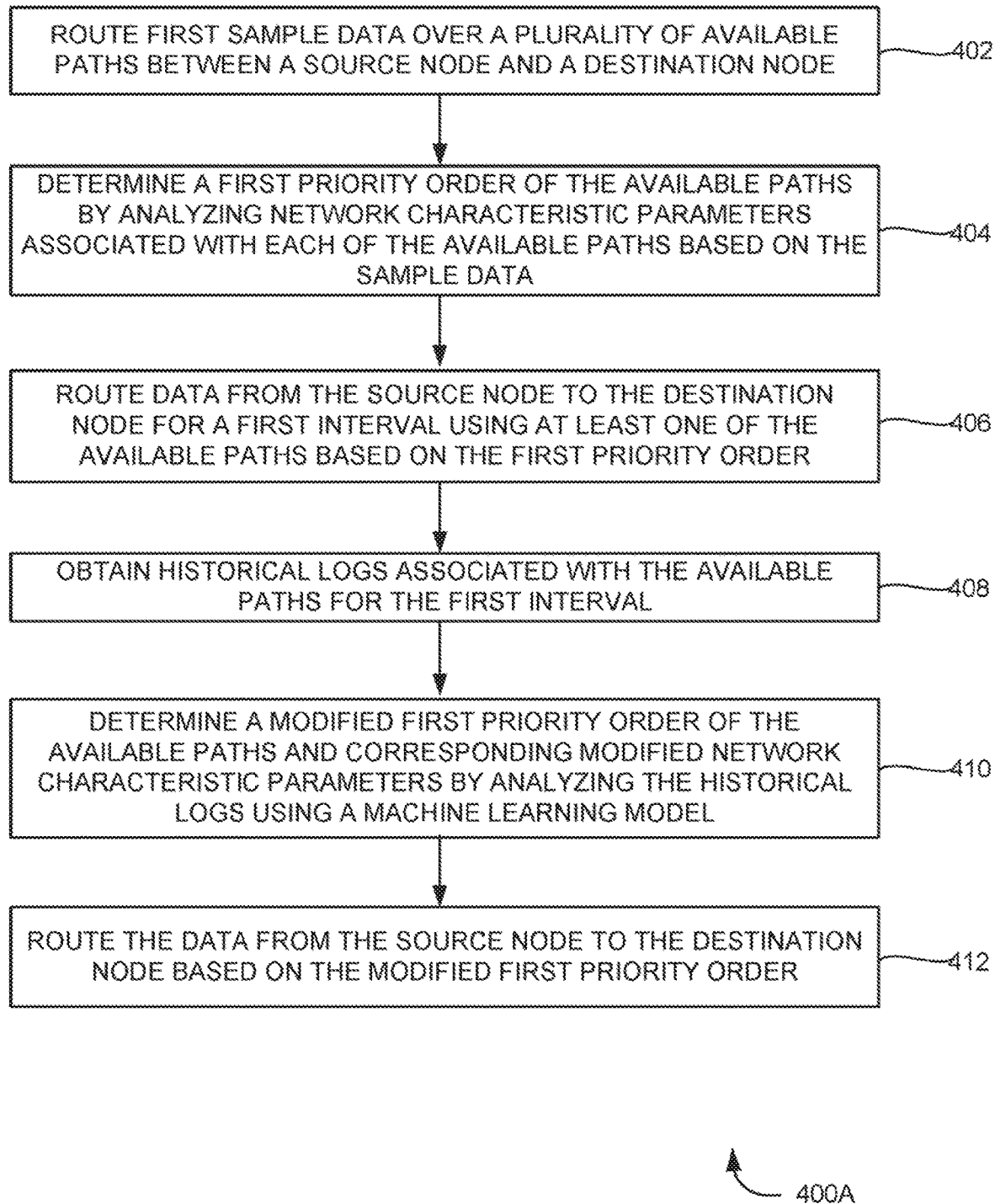
FIG. 4A is an example flow diagram illustrating routing data between a source node and a destination node in a software-defined network based on a priority order of available paths.

FIG. 4A is an example flow diagram 400A illustrating routing data between a source node and a destination node in a software-defined network based on a priority order of available paths. It should be understood that the process depicted in FIG. 4A represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, first sample data may be routed over available paths between a source node and a destination node. In one example, the source node and destination node may include a first edge device and a second edge device, respectively, in a software-defined network. Each of the available paths may include a communication link. Example communication link may include a link type selected from a group consisting of an Internet connection, a multiprotocol label switching (MPLS) connection, a cellular connection, and a cable connection. Further, routing the first sample data over the available paths may include determining the available paths between the source node and the destination node and routing the first sample data over the available paths to monitor the network characteristic parameters associated with each of the available paths.

At 404, a first priority order of the available paths may be determined by analyzing network characteristic parameters associated with each of the available paths based on the sample data. In one example, a routing policy table may be maintained to include the available paths, the first priority order of the available paths, and the corresponding network characteristic parameters upon determining the first priority order. In one example, the data may be routed from the source node to the destination node according to the routing policy table.

At 406, data may be routed from the source node to the destination node for a first interval using at least one of the available paths based on the first priority order. At 408, historical logs associated with the available paths for the first interval may be obtained.

At 410, a modified first priority order of the available paths and corresponding modified network characteristic parameters may be determined by analyzing the historical logs using a machine learning model. In one example, the routing policy table may be dynamically updated to include the modified first priority order of the available paths and the corresponding modified network characteristic parameters upon determining the modified first priority order. At 412, the data may be routed from the source node to the destination node based on the modified first priority order.

Figure 4B:
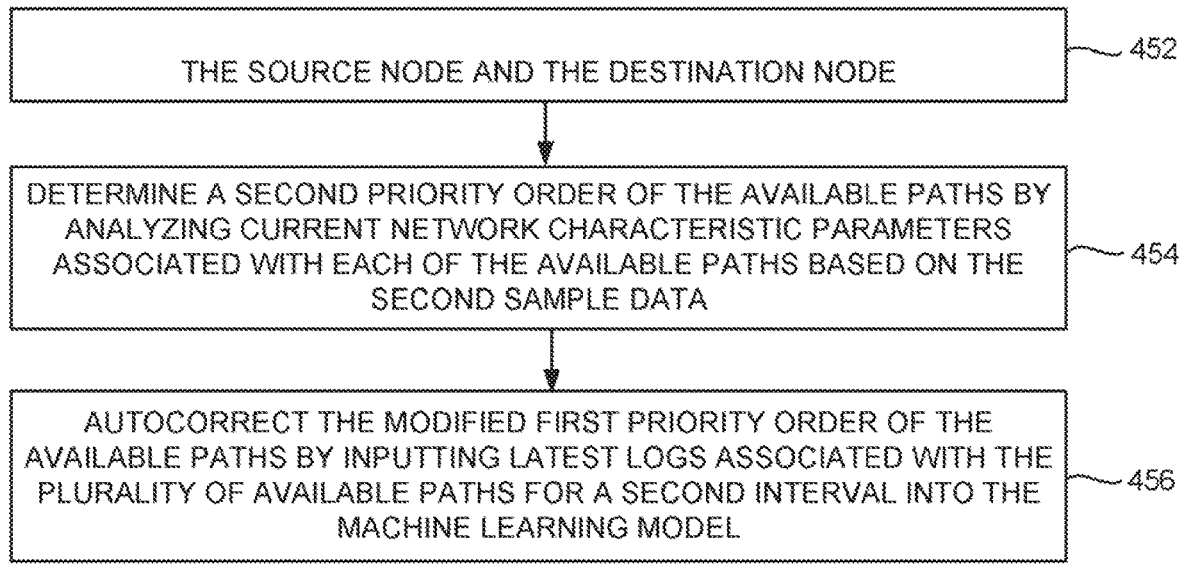
FIG. 4B is an example flow diagram illustrating determining a second priority order of the available paths between the source node and the destination node of FIG. 4A.

FIG. 4B is an example flow diagram 400B illustrating determining a second priority order of the available paths between the source node and the destination node of FIG. 4A. It should be understood that the process depicted in FIG. 4B represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 452, second sample data may be routed over the available paths between the source node and the destination node. In one example, the second sample data may be routed over the available paths between the source node and the destination node at predefined intervals. In another example, actual network characteristic parameters corresponding to routing the data from the source node to the destination node may be determined based on the modified first priority order. Further, the actual network characteristic parameters may be compared with the modified network characteristic parameters. Furthermore, the second sample data may be routed over the available paths between the source node and the destination node upon detecting a drift in at least one of the actual network characteristic parameters based on the comparison.

At 454, a second priority order of the available paths may be determined by analyzing current network characteristic parameters associated with each of the available paths based on the second sample data. Example second priority order may be different from the modified first priority order.

At 456, the modified first priority order of the available paths may be autocorrected by inputting latest logs associated with the plurality of available paths for a second interval into the machine learning model upon determining the second priority order is different from the modified first priority order.

Figure 5:
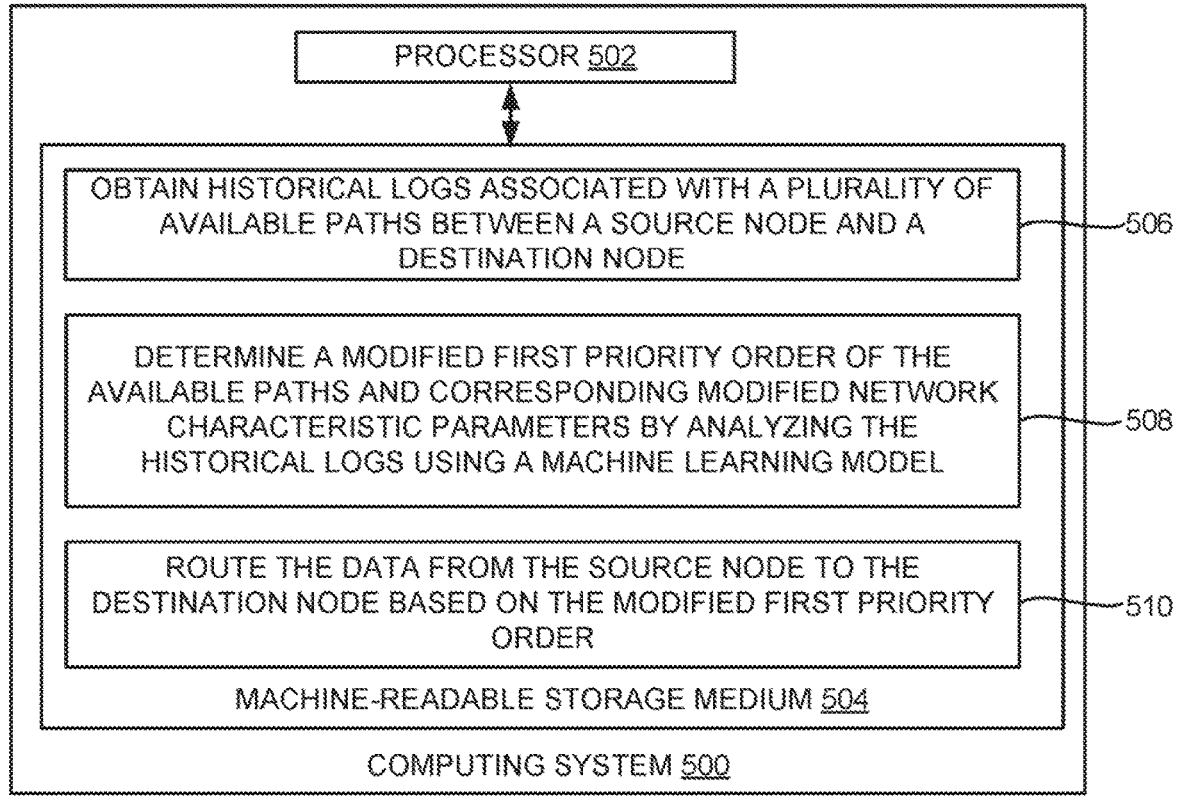
FIG. 5 is a block diagram of an example computing system including non-transitory computer-readable storage medium, storing instructions to route data between a source node and a destination node based on a priority order of available paths.

FIG. 5 is a block diagram of an example computing system 500 including a non-transitory computer-readable storage medium 504, storing instructions to route data between a source node and a destination node based on a priority order of available paths. Computing system 500 may include a processor 502 and machine-readable storage medium 504 communicatively coupled through a system bus. Processor 502 may be any type of central processing unit (CPU), microprocessor, or processing logic that interprets and executes machine-readable instructions stored in the machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to computing system 500.

Machine-readable storage medium 504 may store instructions 506-510. In an example, instructions 506-510 may be executed by processor 502 to route data between the source node and the destination node based on the priority order of available paths. Instructions 506 may be executed by processor 502 to obtain historical logs associated with a plurality of available paths between the source node and the destination node. In one example, the historical logs may be obtained for a first interval by routing data over the available paths based on a first priority order and corresponding network characteristics parameters. Example instructions to obtain the historical logs may include instructions to route first sample data over the available paths between the source node and the destination node, determine the first priority order of the available paths by analyzing the network characteristic parameters associated with each of the available paths based on the sample data, route data from the source node to the destination node for the first interval using at least one of the available paths based on the first priority order, and obtain the historical logs associated with the available paths for the first interval.

Instructions 508 may be executed by processor 502 to determine a modified first priority order of the available paths and corresponding modified network characteristic parameters by analyzing the historical logs using a machine learning model. Further, instructions 510 may be executed by processor 502 to route the data from the source node to the destination node based on the modified first priority order.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A non-transitory computer readable storage medium having instructions that when executed by a processor, cause the processor to:
   obtain historical logs associated with a plurality of available paths between a source node and a destination node, wherein the historical logs are obtained for a first interval by routing data over the available paths based on a first priority order and corresponding network characteristics parameters;
   determine a modified first priority order of the available paths and corresponding modified network characteristic parameters by analyzing the historical logs using a machine learning model;
   route the data from the source node to the destination node based on the modified first priority order;
   determine actual network characteristic parameters corresponding to routing the data from the source node to the destination node based on the modified first priority order;
   compare the actual network characteristic parameters with the modified network characteristic parameters;
   route second sample data over the available paths between source node and the destination node upon detecting a drift in at least one of the actual network characteristic parameters based on the comparison;
   determine a second priority order of the available paths by analyzing current network characteristic parameters associated with each of the available paths based on the second sample data, the second priority order is different from the modified first priority order; and
   autocorrect the modified first priority order of the available paths by inputting latest logs associated with the plurality of available paths for a second interval into the machine learning model upon determining the second priority order is different from the modified first priority order.

2. The non-transitory computer readable storage medium of claim 1, wherein the instructions to obtain the historical logs associated with the available paths comprises instructions to:
   route first sample data over the available paths between the source node and the destination node;
   determine the first priority order of the available paths by analyzing the network characteristic parameters associated with each of the available paths based on the first sample data;
   route the data from the source node to the destination node for the first interval using at least one of the available paths based on the first priority order; and
   obtain the historical logs associated with the available paths for the first interval.

3. The non-transitory computer readable storage medium of claim 2, wherein the instructions to route the first sample data over the available paths comprises instructions to:
   determine the available paths between the source node and the destination node in a software-defined network; and
   route the first sample data over the available paths to monitor the network characteristic parameters associated with each of the available paths.

4. The non-transitory computer readable storage medium of claim 1, wherein routing the second sample data over the available paths between the source node and the destination node is performed at predefined intervals.

5. A non-transitory computer readable storage medium having instructions that when executed by a processor, cause the processor to:
   maintain a routing policy table to include a plurality of available paths, a first priority order of the available paths, and corresponding network characteristic parameters upon determining the first priority order;
   obtain historical logs associated with the plurality of available paths between a source node and a destination node, wherein the historical logs are obtained for a first interval by routine data over the available paths according to the first priority order and the corresponding network characteristics parameters in the routine policy table;
   determine a modified first priority order of the available paths and corresponding modified network characteristic parameters by analyzing the historical logs using a machine learning model;
   dynamically update the routing policy table to include the modified first priority order of the available paths and the corresponding modified network characteristic parameters upon determining the modified first priority order;

route the data from the source node to the destination node according to the modified first priority order in the updated routing policy table;

route second sample data over the available paths between the source node and the destination node based on the modified network characteristic parameters;

determine a second priority order of the available paths by analyzing current network characteristic parameters associated with each of the available paths based on the second sample data, the second priority order is different from the modified first priority order; and autocorrect the modified first priority order of the available paths by inputting latest logs associated with the plurality of available paths for a second interval into the machine learning model upon determining the second priority order is different from the modified first priority order.

6. A method comprising:

routing first sample data over a plurality of available paths between a source node and a destination node;

determining a first priority order of the available paths by analyzing network characteristic parameters associated with each of the available paths based on the first sample data;

routing data from the source node to the destination node for a first interval using at least one of the available paths based on the first priority order;

obtaining historical logs associated with the available paths for the first interval;

determining a modified first priority order of the available paths and corresponding modified network characteristic parameters by analyzing the historical logs using a machine learning model;

routing the data from the source node to the destination node based on the modified first priority order;

determining actual network characteristic parameters corresponding to routing the data from the source node to the destination node based on the modified first priority order;

comparing the actual network characteristic parameters with the modified network characteristic parameters;

routing second sample data over the available paths between the source node and the destination node upon detecting a drift in at least one of the actual network characteristic parameters based on the comparison;

determining a second priority order of the available paths by analyzing current network characteristic parameters associated with each of the available paths based on the second sample data, the second priority order is different from the modified first priority order; and autocorrecting the modified first priority order of the available paths by inputting latest logs associated with the plurality of available paths for a second interval into the machine learning model upon determining the second priority order is different from the modified first priority order.

7. The method of claim 6, wherein routing the first sample data over the available paths between the source node and the destination node comprises:

determining the available paths between the source node and the destination node in a software-defined network; and routing the first sample data over the available paths to monitor the network characteristic parameters associated with each of the available paths.

8. The method of claim 6, wherein routing the second sample data over the available paths between the source node and the destination node is performed at predefined intervals.

9. The method of claim 6, wherein the network characteristic parameters are selected from a group consisting of latency, jitter, round-trip time (RTT), packet loss, and data rate per second.

10. The method of claim 6, wherein the source node and destination node comprise a first edge device and a second edge device, respectively, in a software-defined network.

11. The method of claim 6, wherein each of the available paths comprises a communication link, the communication link includes a link type selected from a group consisting of an Internet connection, a multiprotocol label switching (MPLS) connection, a cellular connection, and a cable connection.

12. The method of claim 6, wherein routing the data from the source node to the destination node for the first interval comprises:

dynamically routing the data associated with different applications via the available paths based on the first priority order and a priority of each of the applications.

13. A method comprising:

routing first sample data over a plurality of available paths between a source node and a destination node;

determining a first priority order of the available paths by analyzing network characteristic parameters associated with each of the available paths based on the first sample data;

maintaining a routing policy table to include the plurality of available paths, the first priority order of the available paths, and corresponding network characteristic parameters upon determining the first priority order;

routing data from the source node to the destination node for a first interval using at least one of the available paths according to the first priority order and the corresponding network characteristics parameters in the routing policy table;

obtaining historical logs associated with the available paths for the first interval;

determining a modified first priority order of the available paths and corresponding modified network characteristic parameters by analyzing the historical logs using a machine learning model;

dynamically updating the routing policy table to include the modified first priority order of the available paths and the corresponding modified network characteristic parameters upon determining the modified first priority order;

routing the data from the source node to the destination node according to the modified first priority order in the updated routing policy table;

routing second sample data over the available paths between the source node and the destination node based on the modified network characteristic parameters;

determining a second priority order of the available paths by analyzing current network characteristic parameters associated with each al the available paths based on the second sample data, the second priority order is different from the modified first priority order; and autocorrecting the modified first priority order of the available paths by inputting latest logs associated with the plurality of available paths for a second interval into the machine learning model upon determining the second priority order is different from the modified first priority order.

14. A system for routing connections in a software-defined network comprising:
   a source node and a destination node that are interconnected with each other via networks; and
   a management node communicatively coupled to the source node and the destination node, wherein the management node comprises a knowledge-defined policy engine to:
      route first sample data over a plurality of available paths between a source node and a destination node;
      determine a first priority order of the available paths by analyzing network characteristic parameters associated with each of the available paths based on the first sample data;
      route data from the source node to the destination node for a first interval using at least one of the available paths based on the first priority order;
      obtain historical logs associated with the available paths for the first interval;
      determine a modified first priority order of the available paths and corresponding modified network characteristic parameters by analyzing the historical logs using a machine learning model;
      route the data from the source node to the destination node based on the modified first priority order;
      determine actual network characteristic parameters corresponding to routing the data from the source node to the destination node based on the modified first priority order;
      compare the actual network characteristic parameters with the modified network characteristic parameters;
      route second sample data over the available paths between the source node and the destination node upon detecting a drift in at least one of the actual network characteristic parameters based on the comparison;
      determine a second priority order of the available paths by analyzing current network characteristic parameters associated with each of the available paths based on the second sample data, the second priority order is different from the modified first priority order; and
      autocorrect the modified first priority order of the available paths by inputting latest logs associated with the plurality of available paths for a second interval into the machine learning model upon determining the second priority order is different from the modified first priority order.

15. The system of claim 14, wherein the knowledge-defined policy engine is to:
   determine the available paths between the source node and the destination node in the software-defined network; and
   route the first sample data over the available paths to monitor the network characteristic parameters associated with each of the available paths.

16. The system of claim 14, wherein the knowledge-defined policy engine is to:
   route the second sample data over the available paths between the source node and the destination node at predefined intervals.

17. A system for routing connections in a software-defined network comprising:
   a source node and a destination node that are interconnected with each other via networks; and
   a management node communicatively coupled to the source node and the destination node, wherein the management node comprises a knowledge-defined policy engine to:
      route first sample data over a plurality of available paths between a source node and a destination node;
      determine a first priority order of the available paths by analyzing network characteristic parameters associated with each of the available paths based on the first sample data;
      maintain a routing policy table to include the plurality of available paths, the first priority order of the available paths, and corresponding network characteristic parameters upon determining the first priority order;
      route data from the source node to the destination node for a first interval using at least one of the available paths according to the first priority order and the corresponding network characteristics parameters in the routing policy table;
      obtain historical logs associated with the available paths for the first interval;
      determine a modified first priority order of the available paths and corresponding modified network characteristic parameters by analyzing the historical logs using a machine learning model;
      dynamically update the routing policy table to include the modified first priority order of the available paths and the corresponding modified network characteristic parameters upon determining the modified first priority order;
      route the data from the source node to the destination node according to the modified first priority order in the updated muting policy table;
      route second sample data over the available paths between the source node and the destination node based on the modified network characteristic parameters;
      determine a second priority order of the available paths by analyzing current network characteristic parameters associated with each of the available paths based on the second sample data, the second priority order is different from the modified first priority order; and
      autocorrect the modified first priority order of the available paths by inputting latest logs associated with the plurality of available paths for a second interval into the machine learning model upon determining the second priority order is different from the modified first priority order.

* * * * *